(12) United States Patent
Truss

(10) Patent No.: US 6,959,719 B2
(45) Date of Patent: Nov. 1, 2005

(54) FIRE COLLAR

(76) Inventor: James Walter George Truss, Unit 2, 160 Redland Bay Road, Capalaba, Queensland 4157 (AU)

( * ) Notice: Subject to any disclaimer, the term of this patent is extended or adjusted under 35 U.S.C. 154(b) by 0 days.

(21) Appl. No.: 10/488,746

(22) PCT Filed: Sep. 9, 2002

(86) PCT No.: PCT/AU02/01235
§ 371 (c)(1),
(2), (4) Date: Sep. 13, 2004

(87) PCT Pub. No.: WO03/023267
PCT Pub. Date: Mar. 20, 2003

(65) Prior Publication Data
US 2005/0022868 A1 Feb. 3, 2005

(30) Foreign Application Priority Data
Sep. 10, 2001 (AU) ............................................. PR 7576

(51) Int. Cl.[7] ........................... F16K 17/38; F16K 3/26; F16K 5/06; F16L 5/04
(52) U.S. Cl. ............................. 137/72; 137/75; 137/79; 251/315.05; 251/315.16
(58) Field of Search ............................. 137/72, 75, 79; 251/315.03, 315.04, 315.05, 315.16

(56) References Cited

U.S. PATENT DOCUMENTS

| 3,782,681 A | | 1/1974 | Blackstein | |
|---|---|---|---|---|
| 4,084,744 A | * | 4/1978 | Wilson, Jr. | 236/49.2 |
| 4,742,957 A | * | 5/1988 | Mentuch | 237/46 |
| 6,161,564 A | * | 12/2000 | Cornwall | 137/75 |
| 6,279,597 B1 | * | 8/2001 | Schulze | 137/75 |

FOREIGN PATENT DOCUMENTS

| AT | 399 210 B | | 4/1995 |
|---|---|---|---|
| DE | 41 03 987 A1 | * | 10/1991 |
| DE | 44 44 503 A1 | | 2/1996 |
| EP | 0 472 937 A1 | | 3/1992 |
| FR | 2 242 846 A | | 3/1975 |
| WO | WO 88/06691 A | | 9/1988 |

* cited by examiner

Primary Examiner—Ramesh Krishnamurthy
(74) Attorney, Agent, or Firm—Finnegan, Henderson, Farabow, Garrett & Dunner, L.L.P.

(57) ABSTRACT

A fire collar or fire damper for location within a concrete slab of a building. The device incorporates a damper arrangement (12) and a heat detector (18, 19) comprising a metal alloy or lead which melts when a preset temperature is reached, causing the damper arrangement to seal off associated pipework or ducting.

9 Claims, 4 Drawing Sheets

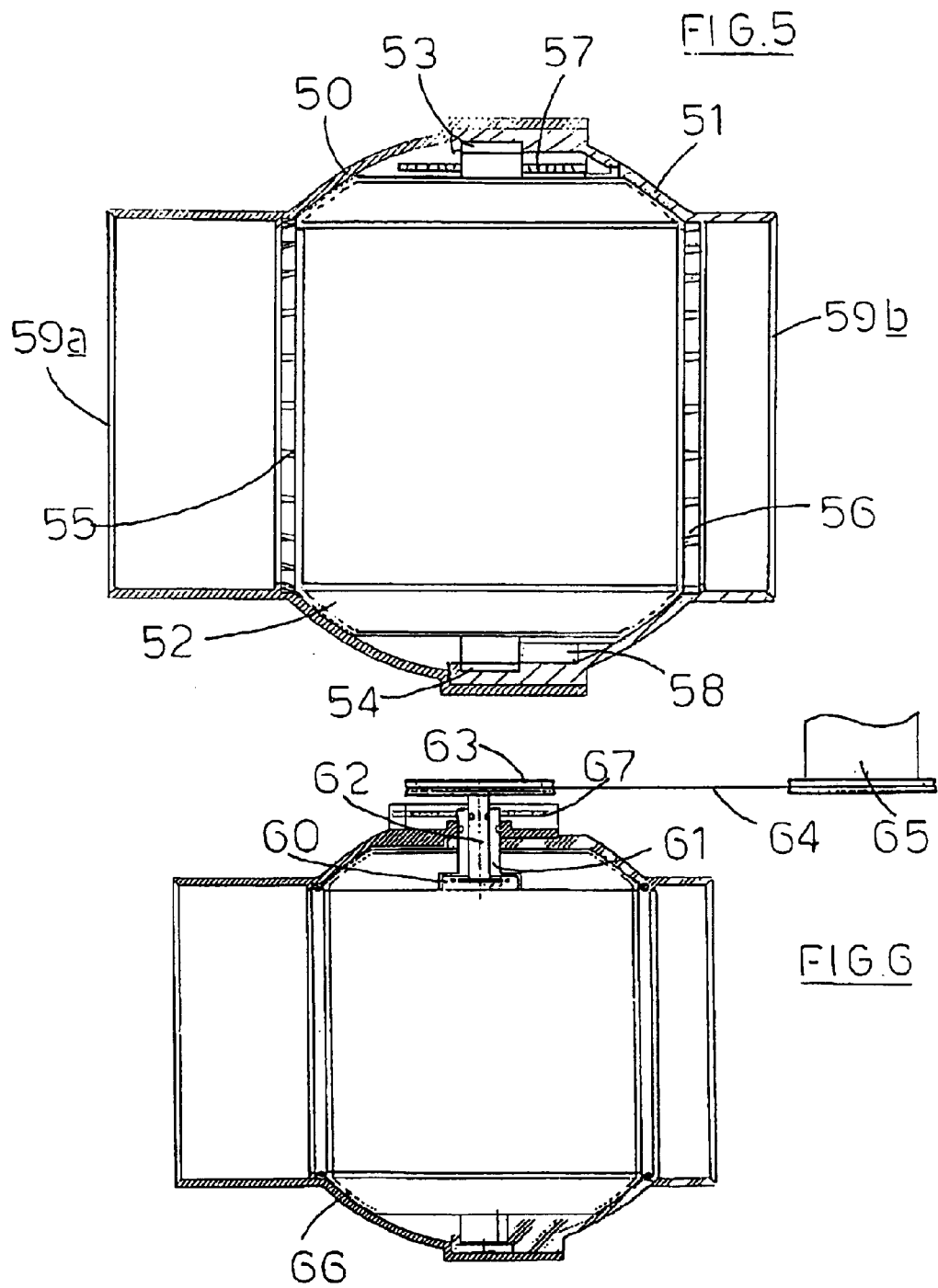

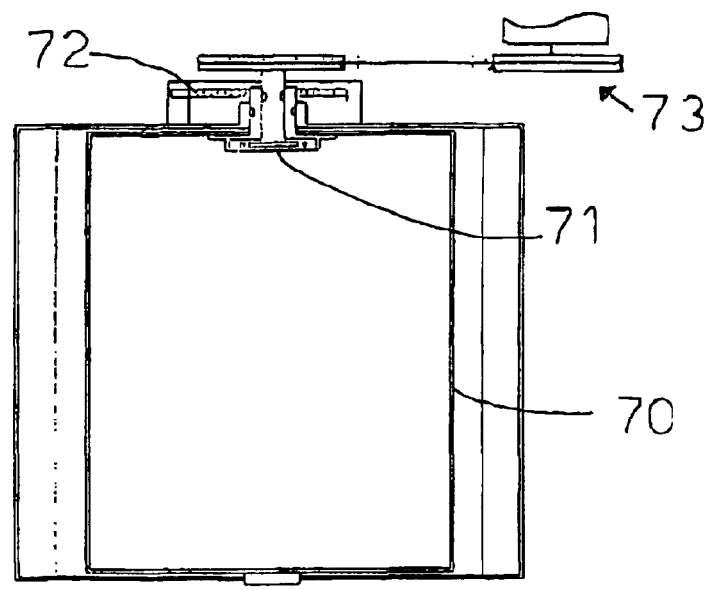
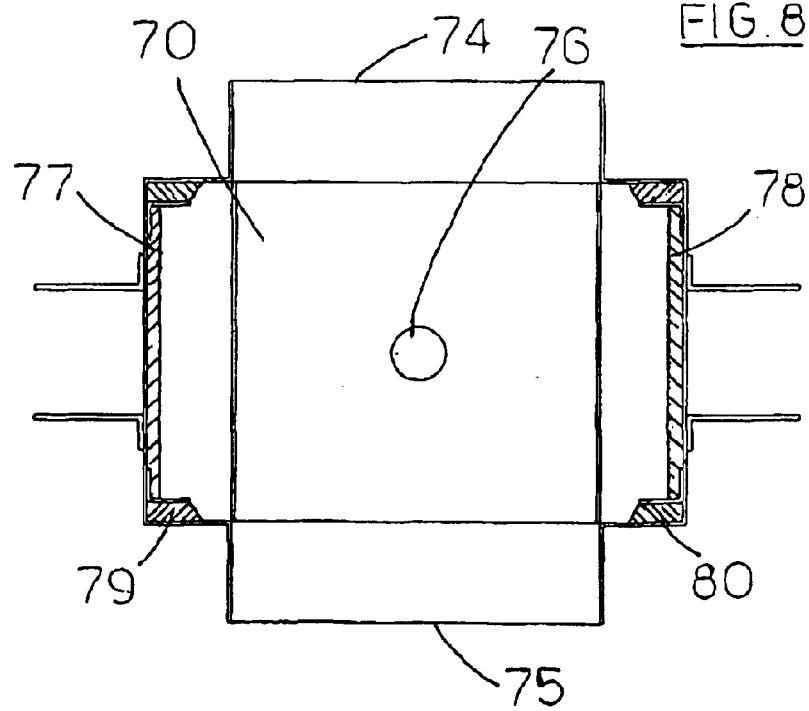

FIRE COLLAR

FIELD OF THE INVENTION

This invention relates to a device for preventing fire from spreading from one side of a partition to another by way of pipework or ducting in the partition. In particular, the invention is primarily concerned with a new form of fire damper and a fire collar for location in a concrete slab separating the floors and walls of multi-floor buildings.

BACKGROUND OF THE INVENTION

A common type of fire collar comprises a metal collar which is fastened around a concrete slab-penetrating plastics material pipe in the region where it traverses the slab; the collar enclosing an intumescent material. When a fire on one side of the concrete slab reaches a sufficient intensity to melt the pipe where it penetrates the slab, it also causes the intumescent material to expand and seal off the void left by the melted pipe. In this way, a barrier is formed to prevent the spread of the fire to the other side of the concrete slab.

A major problem with this type of fire collar is that the time taken for the intumescent material to form a seal can be too long in rapidly advancing fires with the result that the fire can still spread to the other side of the partition.

A recent attempt to overcome this problem is a fire damper comprising a tubular insert having a grid of intumescent material formed across the circumference of the pipe or duct. However, although such an arrangement enables very quick sealing to occur, it has the disadvantage that it slows down the passage of fluid along the pipe or duct. Such a slowdown is amplified by the number of concrete slabs which the pipe or duct traverses to the extent that complete blockage of the fluid can ultimately occur.

OBJECT OF THE INVENTION

It is therefore an object of the invention to provide a new form of fire collar/fire damper which obviates the aforementioned disadvantages or at least provides the public with a useful alternative.

SUMMARY OF THE INVENTION

According to the present invention in its broadest form, there is provided a housing for fitting into pipework or ducting at the location the pipework or ducting traverses a partition, which housing incorporates a damper arrangement and a heat detector, wherein the damper arrangement is designed to normally enable unimpeded fluid flow through the pipework or ducting but to seal off the pipework or ducting when the heat detector reacts to a preset temperature value.

By "fluid" is intended to mean gases, such as air-conditioning air, waste gases, and liquids such as liquid wastes and water.

DETAILED DESCRIPTION OF THE INVENTION

Preferably, the damper arrangement incorporates a cylinder or ball valve having an internal passageway which is of the same or similar diameter to that of the pipework or ducting in which it is fitted. The cylinder or ball valve is arranged so as to be rotatable about an axis so that it can rotate between a normal open position where passage of fluid through the pipework or ducting is unimpeded to a position, generally at right angles to the open position, where passage of fluid to prevented.

Rotation of the cylinder or ball valve can be achieved by mechanical and/or electrical means. Mechanical rotation can be, for instance, by the use of a spiral spring retained in a recess formed in an exterior wall of the housing, having its outer end held by the housing and its inner end held by the cylinder or ball valve. In its normal configuration, the spring is under tension but it cannot rotate the ball or cylinder to a closed position until the heat detector reacts to a preset temperature value. The closed position can be established by a pin located in the housing wall which meets a stop when rotation through 90° has been made.

In one form of the invention, the heat detector can be formed from a material which has the dual properties of, firstly, being capable of bonding or interlocking with an element of the damper arrangement and the housing and, secondly, being able to yield its bond or lock when it is heated to a predetermined temperature value. These properties enable the heat detector to be designed and located in such a manner that it will normally ensure that the damper arrangement is held open but when a predetermined, ie. preset, temperature is reached, it will yield enabling the damper arrangement to close.

Suitable heat detector materials are lead and its alloys, plastics materials and various composites. Typically, the temperature at which such materials yield will be in the range of 60°–120° C., depending upon the particular application, so as to meet governmental or local council requirements.

The heat detector material can be located, for instance, in the interior perimeter of the housing where an element of the damper arrangement has an adjacency when in an open configuration. Thus, in the case of a ball valve, a circular seal of heat detector material, such as a ring of lead can be located between the housing and the ball valve at both the inlet and outlet sides.

In another form, the heat detector material can comprise an alloy pad formed on the end of a bearing shaft which extends through the wall of the housing to a location within the damper arrangement, preferably at a location which does not impede the flow of fluid through the housing. A spiral spring retained in a recess on the outer side of the housing connects the shaft to the housing. The spring is normally held under compression and is only released from compression when the alloy pad yields upon being heated to the preset temperature, thereby enabling the shaft and damper to rotate to a closed position.

In yet another form of the invention, the heat detector can be a thermocouple. The thermocouple can be connected by way of appropriate circuitry to a solenoid which can retract a pin extending between the housing and the damper arrangement, to permit the damper arrangement to close when the thermocouple detects a predetermined temperature value. Such a situation also permits the damper to be reset to an open configuration as well as the simultaneous operation of other fire collars within the partition.

In order to test the integrity of the fire collar/damper arrangement, testing means can be provided which enable the damper to be moved between its open and closed configurations. Such testing means can be automatic or manual. An automatic testing means can comprise a motor which drives, for instance, the aforementioned bearing shaft so as to rotate the attached damper. A manual testing means can consist of a simple lever fitted to the bearing shaft.

The fire collar according to the invention is ideally fabricated from ceramic materials but other materials such as fibre-reinforced concrete, metal and the like can also be used depending upon the specific usage. Preferably, the damper arrangement incorporates a cylinder or ball made from plastics material having an intumescent material embedded between inner and outer layers of the plastics material. The intumescent material expands when the cylinder or ball has rotated to its closed position, thereby providing an additional fire-stop feature.

Usage of the fire collar/fire damper can range across a large number of fields from plumbing to ventilation and air-conditioning installations.

BRIEF DESCRIPTION OF THE DRAWINGS

FIG. 5 is a side view of a fire collar according to another aspect of the present invention;

FIG. 6 is a side view of a fire collar according to yet another aspect of the present invention;

FIG. 7 is an end view of a fire damper assembly accordingly to still yet another aspect of the present invention; and FIG. 8 is a side view of the fire damper assembly of FIG. 7.

DESCRIPTION OF PREFERRED EMBODIMENTS

Figure 1:
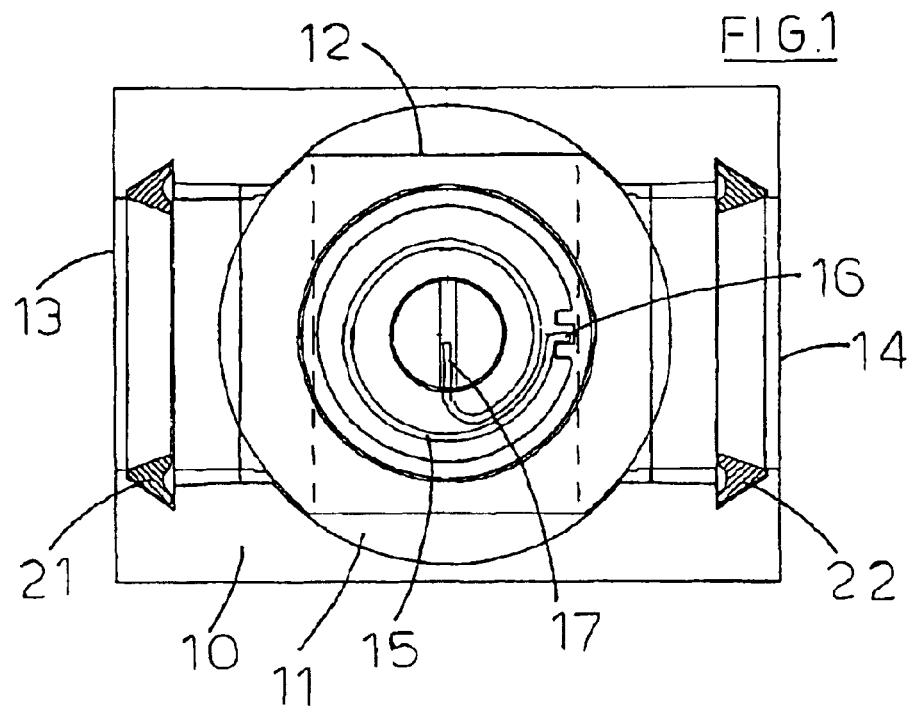
FIG. 1 is a top view of a fire collar according to the invention showing a closed damper arrangement.
Figure 2:
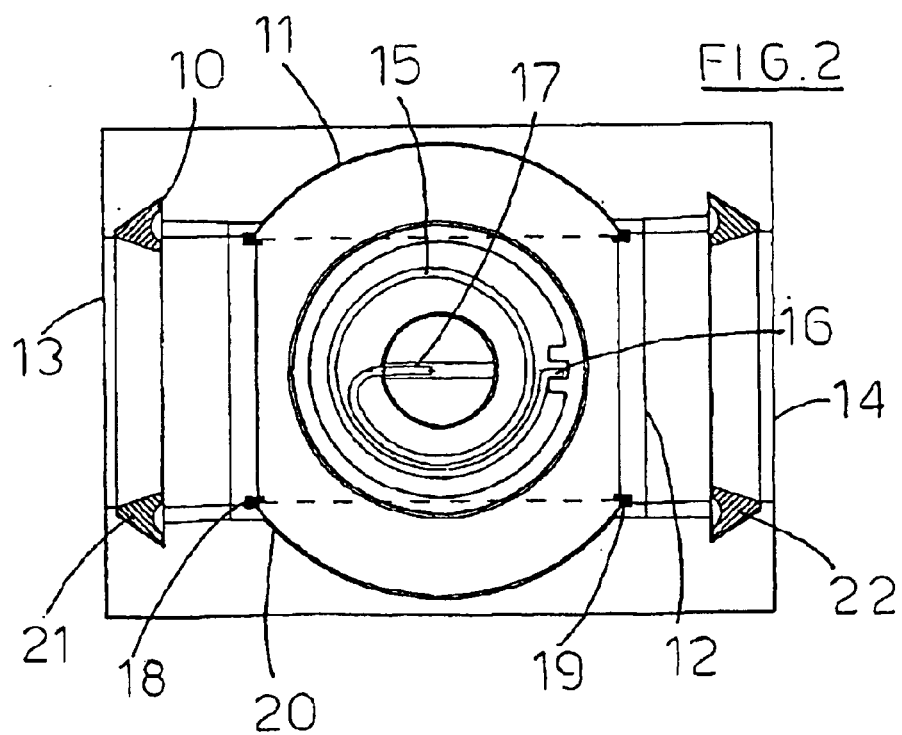
FIG. 2 is a top view of the fire collar shown in FIG. 1 with the damper arrangement open.

Preferred embodiments of the invention will now be described with reference to the drawings, in each of which like reference numerals refer to like parts.

Figure 3:
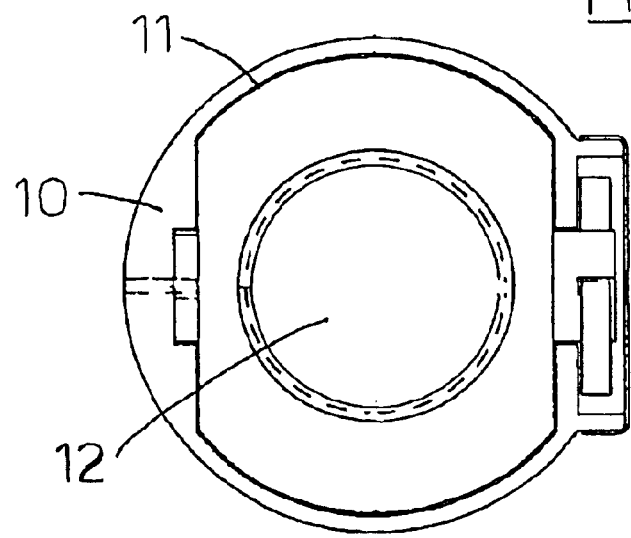
FIG. 3 is an end view of the fire collar shown in FIG. 1.
Figure 4:
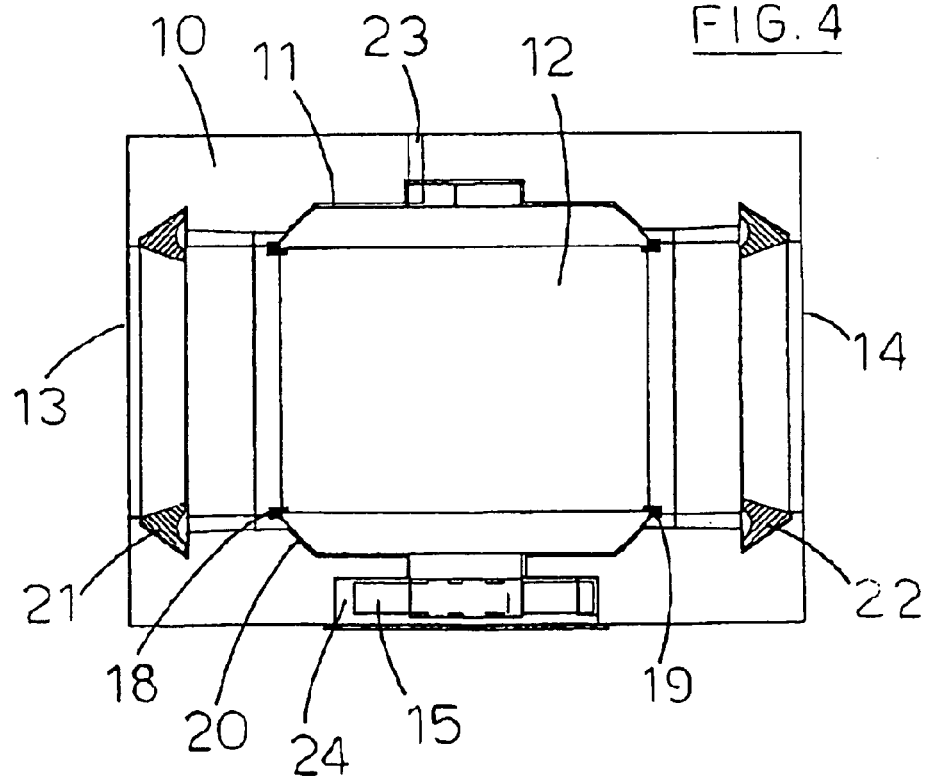
FIG. 4 is a side view of the fire collar shown in FIG. 1.

Referring firstly to FIGS. 1–4, the fire collar comprises a ceramic housing 10 having a partially spherical ceramic ball valve 11, that is, the ball valve has two opposing sectors removed as can be seen in FIG. 3, centrically located therein. The ceramic housing may be formed by heat welding two hemispheres together after the ball valve 11 has been located therein.

The spherical ball valve 11 has a passageway 12 extending from one side to the other with a diameter which corresponds to the diameter of the housing inlet 13 and outlet 14. The housing inlet 13 and outlet 14, in turn, have diameters which do not impede the flow of fluid there through from attached pipework or ducting. There is thus unimpeded fluid flow through the fire collar.

A recess 24 is formed in the outer wall of the housing and a stainless steel spiral spring 15 is located therein. The spiral spring has one end 16 bent so as to be retained within a hub of the housing and the other end 17 cranked for retention by the ball valve 11.

Two rings 18, 19 or lead alloy are bonded between the housing and the ball valve, and additionally seal the end of the small gap 20 between the ball valve and its seat. The gap 20 can be maintained by small ridges formed on the surface of the ball valve. Such a gap is useful for preventing binding between the ball valve and its seat such as could potentially occur over time.

Elastomeric seals 21, 22 enable quick secure fractional attachment to a plastics material ventilation pipe extending from a toilet or similar odour producing facility.

The fire collar depicted in FIGS. 1–4 is designed to be located within a concrete slab of a high rise building. In use, the fire collar will maintain the open configuration shown, for instance, in FIG. 2 until such time as a fire occurs on either side of the concrete slab. When the fire reaches the ventilation-hydraulic pipe at the point of attachment to the fire collar, and the temperature climbs to the pre-set value, the lead alloy ring seals 18, 19 melt and the ball valve is then free to rotate under the tension of the spiral spring 15. Rotation continues until the passageway 12 in the ball valve is in alignment with the inlet 13 and outlet 14 at which point a stop pin 23 in the ball valve quadrant prevents further rotation.

Referring to FIG. 5, the fire collar comprises a two-part plastics material housing 50, 51 whose components press-fit together so as to enclose a partially spherical hollow plastics material ball 52 having opposed openings so as to provide a through passageway for fluid when in an open configuration. The ball 52 includes an intumescent material which is encased within the walls of the ball.

The ball 52 is rotatable between an open and a closed position upon integrally formed pivots 53, 54 which are housed in recesses formed in the wall of the housing. Under normal, in use, conditions, the ball is retained in an open position by two rings of lead 55, 56 contained in annular recesses in the housing at the entry and at sides of the ball.

The ball 53 is held under tension in its open position by virtue of a flat coil spring 57. The spring is tensioned to rotate the ball through ninety degrees when the lead rings 55, 56 yield at a preset temperature. Continued rotation of the ball 53 is prevented by a stop 58 formed by a wall of the housing.

The fire collar can be readily connected to the pipework by means of cylindrical connecting elements 59a, 59b.

FIG. 6 is a modified version of the fire collar shown in FIG. 5. This version enables the fire collar to be tested at desired intervals to ensure that the ball can be rotated and has not become jammed or otherwise inoperable. The main difference from the FIG. 5 version is that the heat detector component comprises an alloy pad 60 formed on the end of a square drive shaft 61. A secondary internal drive shaft 62 also joins with this alloy pad and connects to a pulley 63, which is rotatable by means of an actuating cable 64 connected to a motor 65.

In general use, the motor is actuated to rotate the fireball 66 between an open and closed position and back again, to test the integrity of the system at desired time intervals.

During a fire, the alloy pad 60 yields and the fireball 66 rotates under the action of a coil spring 67, as the mechanical connection between the square drive shaft 61 and the internal drive shaft 62 is disengaged.

FIGS. 7 and 8 show a general damper arrangement which is based upon the same principal of operation as the FIG. 6 embodiment.

The damper arrangement comprises a rotating damper 70 in which a heat detecting metal alloy pad 71 is located with the same type of coil spring 72 and testing 73 set-up as described with FIG. 6.

The damper is connected to ducting at 74, 75 and is pivotal at 76. Intumescent material is located at 77, 78 and intumescent lip seals are positioned at 79, 80.

The function of this damper is similar to that of the previous embodiment.

What is claimed is:

1. A housing for fitting into pipework or ducting at the location the pipework or ducting traverses a partition, said housing comprising a damper arrangement and a heat detector, the damper arrangement being designed to normally enable unimpeded fluid flow through the pipework or ducting, but to seal off the pipework or ducting from fluid flow when the heat detector reacts to a preset temperature value, said damper arrangement including a cylinder or ball valve having an internal passageway which is of substantially the same diameter as that of the pipework or ducting, said cylinder or ball valve being rotatable between an open position where the passage of fluid through the pipework or ducting is unimpeded, and closed position, where the passage of fluid is prevented and said cylinder or ball valve being made from a plastic material having an intumescent material embedded between inner and outer layers of the plastic material.

2. The housing of claim 1, wherein the heat detector is a material which yields at the preset temperature value to enable the cylinder or ball valve to rotate to the closed position.

3. The housing of claim 2, wherein the material of the heat detector is lead or a lead alloy which yields at a specific temperature within a temperature range of from 60° to 120° C.

4. The housing of claim 1, wherein the heat detector is a seal located between the housing and the damper arrangement which mechanically retains the cylinder or ball valve of the damper arrangement in the open position until the heat detector reaches its reset temperature value when it yields and permits the cylinder or ball valve of the damper arrangement to rotate to the closed position.

5. The housing of claim 1, wherein the heat detector is a thermocouple having associated circuitry and mechanical action which can retract a pin extending between the housing and the damper arrangement to permit the cylinder or ball valve of the damper arrangement to rotate to the closed position when the thermocouple detects the preset temperature value.

6. The housing of claim 1, wherein the cylinder or ball valve is rotatable by means of a spiral spring retained in a recess formed in a wall of the housing, said spiral spring having an outer end held by the housing and an inner end held by the cylinder or ball valve.

7. The housing of claim 1, wherein the heat detector is an alloy pad formed on a bearing shaft which extends through a wall of the housing to a location within the housing.

8. The housing of claim 7, wherein a spiral spring retained in a recess on an outer side of the housing connects the shaft to the housing and is normally held under compression, which spring is released from compression when the alloy pad yields upon being heated to the preset temperature valve, thereby enabling the shaft and the cylinder or ball valve of the damper arrangement to rotate to the closed position.

9. The housing of claim 7, including a testing device which includes a motor which can rive the bearing shaft so as to rotate the cylinder or ball valve of the damper arrangement between the open and closed positions, and back again.

\* \* \* \* \*

UNITED STATES PATENT AND TRADEMARK OFFICE
CERTIFICATE OF CORRECTION

PATENT NO. : 6,959,719 B2
DATED : November 1, 2005
INVENTOR(S) : James Walter George Truss It is certified that error appears in the above-identified patent and that said Letters Patent is hereby corrected as shown below:

Column 5,
Line 10, "and closed" should read -- and a closed --.
Line 21, "60º to" should read -- 60ºC to --.
Line 27, "reset" should read -- preset --.

Column 6,
Line 25, "rive" should read -- drive --.

Signed and Sealed this

Fourteenth Day of March, 2006

JON W. DUDAS
*Director of the United States Patent and Trademark Office*